(12) United States Patent
Mandal (10) Patent No.: US 8,872,541 B2
(45) Date of Patent: Oct. 28, 2014

(54) DYNAMIC ADAPTATION OF CONTINUOUS TIME LINEAR EQUALIZATION CIRCUITS

(71) Applicant: Intel Corporation, Santa Clara, CA (US)

(72) Inventor: Subratakumar Mandal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 13/746,147

(22) Filed: Jan. 21, 2013

(65) Prior Publication Data

US 2014/0203839 A1   Jul. 24, 2014

(51) Int. Cl.
*H03K 17/16* (2006.01)
*H03H 7/38* (2006.01)

(52) U.S. Cl.
CPC ........................................ *H03H 7/38* (2013.01)
USPC .............................................. 326/30; 326/87

(58) Field of Classification Search
None
See application file for complete search history.

(56) References Cited

U.S. PATENT DOCUMENTS

| | | | |
|---|---|---|---|
| 6,380,758 B1 * | 4/2002 | Hsu et al. | 326/30 |
| 7,114,087 B2 | 9/2006 | Watnik | |
| 7,161,851 B2 | 1/2007 | Peterson | |
| 7,940,840 B2 * | 5/2011 | Tian et al. | 375/229 |
| 8,396,110 B1 * | 3/2013 | Hsieh | 375/233 |
| 2008/0101450 A1 * | 5/2008 | Wu et al. | 375/232 |
| 2009/0167402 A1 * | 7/2009 | Tian et al. | 327/307 |
| 2012/0106539 A1 * | 5/2012 | Ferraiolo et al. | 370/351 |
| 2012/0106687 A1 * | 5/2012 | Bulzacchelli et al. | 375/354 |

* cited by examiner

*Primary Examiner* — Crystal L Hammond
(74) *Attorney, Agent, or Firm* — Trop, Pruner & Hu, P.C.

(57) ABSTRACT

An embodiment of the invention includes dynamically adjusting gain peaking of circuit logic such that error rates are acceptable across various process/voltage/temperature (PVT) ranges. An embodiment uses PVT dependant programming, such as but not limited to resistance compensation (RCOMP) codes, to control impedance compensation logic, such as but not limited to a Continuous Time Linear Equalization (CTLE) circuit. The PVT programming may be used to control gain peaking amplitude and gain peaking frequency across ranges of different PVTs. As a result, error performance is not impaired across different PVT corners and gain peaking is more consistent across different PVT corners. Other embodiments are included herein.

25 Claims, 6 Drawing Sheets

| PVT Conditions | RCOMP Code | Rs Code | Cs Code | Rp Code |
|---|---|---|---|---|
| rfff, 0#C, 1.05V | 11111 | 111 (2#K Ohm) | 111 (200#pF) | 111 (2#K Ohm) |
| ................... | | | | |
| ................... | | | | |
| ................... | | | | |
| ................... | | | | |
| tttt, 90#C, 1.0V | 10000 | 010 (1#K Ohm) | 100 (150#pF) | 011 (12#K Ohm) |
| ................... | | | | |
| ................... | | | | |
| ................... | | | | |
| ................... | | | | |
| rsss, 111#C, 0.9V | 00000 | 000 (0.5#K Ohm) | 000 (125#pF) | 000 (20#K Ohm) |

DYNAMIC ADAPTATION OF CONTINUOUS TIME LINEAR EQUALIZATION CIRCUITS

BACKGROUND

Impedance mismatches in circuits may be caused by several factors including type of process used to create a circuit component, junction temperature, die temperature profile, noise, power supply fluctuations, device age, and warm-up variations. Many of these factors are more generally referred to as "process/voltage/temperature" (PVT) factors. Performance of an analog circuit can vary based upon variations in PVT factors. Some of the performance characteristics of the circuit or electronic component that may change due to PVT variations include clock to output time, input drive current, output drive current, and the like. PVT conditions are sometimes classified into "corners." The term "fast corner" or "FFFF" corner refers to the operation of a circuit at its fastest, strongest performance where PVT conditions promote the fastest, strongest performance. The term "slow" or "RSSS" corner refers to the operation of a circuit at its slowest, weakest performance where PVT conditions promote the slowest, weakest performance. The SSSS, RSSS and FFFF corners are extreme corners for PVT conditions.

BRIEF DESCRIPTION OF THE DRAWINGS

Features and advantages of embodiments of the present invention will become apparent from the appended claims, the following detailed description of one or more example embodiments, and the corresponding figures, in which:

FIG. 5 includes a process in an embodiment of the invention.

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

For high speed input/output (I/O) links (e.g., Peripheral Component Interconnect Express (PCIe) Generation 3 link) the link channel behaves like a low pass filter, thereby resulting in high frequency attenuation that hinders high data transfer rates. To address high frequency attenuation, a Continuous Time Linear Equalization (CTLE) circuit may be used to provide better gain peaking at high frequencies. However, first order CTLE circuits show significant dependency of gain peaking on peaking frequency and have inadequate gain peaking at frequencies above about 6.0 Gigabytes/second (GB/s). Even second order CTLE circuits fail to deliver adequate gain peaking at frequencies above about 8.0 GB/s.

Beyond the complications imposed by higher frequency data rates, gain peaking characteristics are adversely impacted by PVT variations. At data rates of about 8 GB/s and above PVT variations impair circuit performance by providing different and inconsistent gain peaking across different PVT corners. For example, the circuit performs differently for fast and slow PVT corners. As a result, PVT variations adversely impact the Bit Error Rate (BER) of the link.

Figure 1:
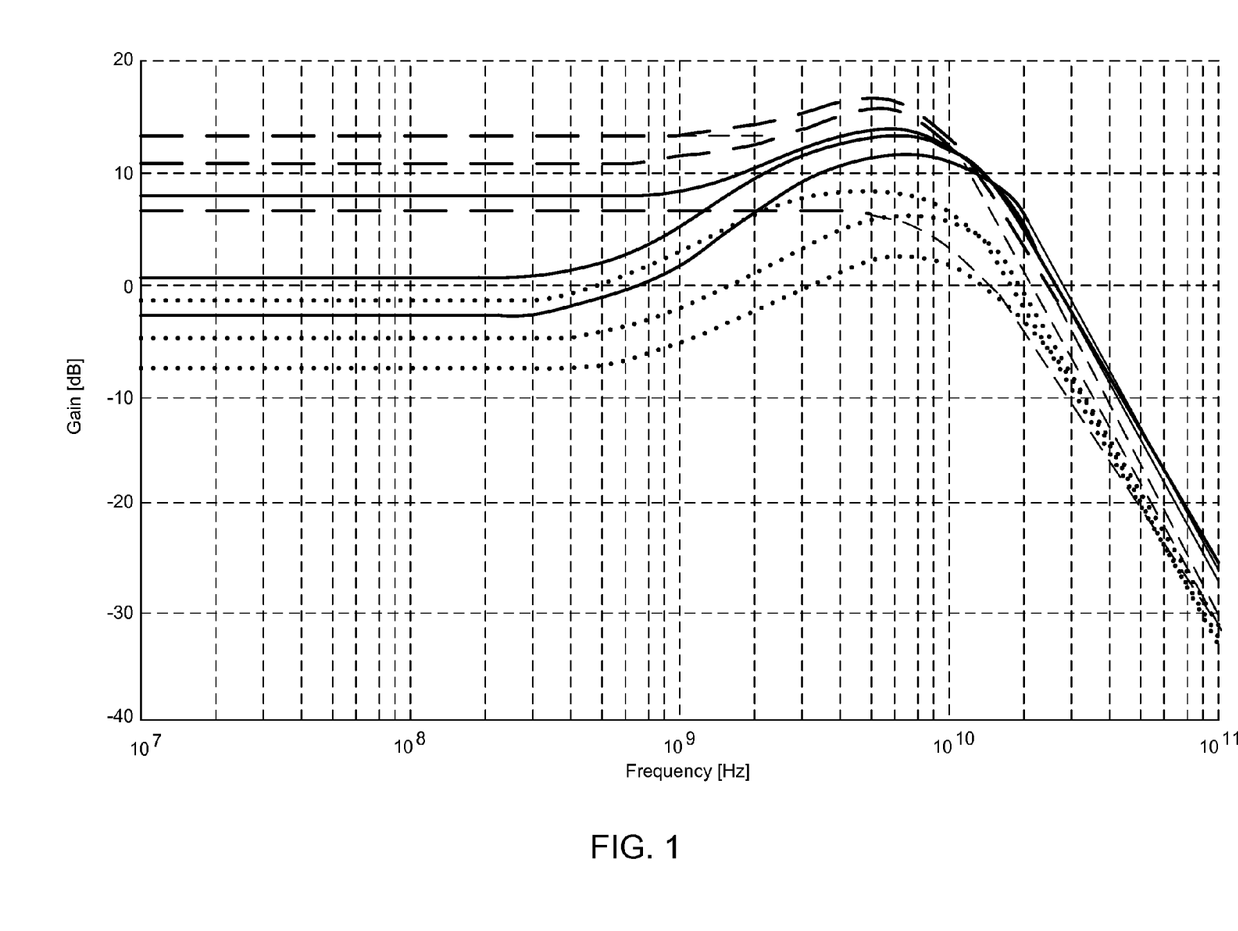
FIG. 1 includes a plot of frequency vs. gain characteristics across different PVT corners.

FIG. 1 includes a plot of frequency vs. gain characteristics across different PVT corners. The solid lines represent typical corner characteristics, the dotted lines represent fast corner characteristics, and the dashed lines represent slow corner characteristics. FIG. 1 illustrates how gain peaking changes as data transfer frequencies increase. Further, FIG. 1 shows the variance of gain peaking across PVT corners. For example, at approximately $10^{10}$ Hz the gain peaking for fast corners (dotted line) is lower than gain peaking for slow corners (dashed line). This variance in performance among corners is problematic for circuits and can lead to unacceptable BERs.

An embodiment of the invention includes dynamically adjusting gain peaking of, for example, a CTLE circuit, such that BERs are acceptable across some or all PVT corners (and points between those PVT corners). The embodiment uses PVT dependant programming, such as but not limited to resistance compensation (RCOMP) codes, in impedance compensation logic. The PVT programming may be used to control, for example, on-die termination resistance (RTERM). The PVT programming may be used to dynamically program a CTLE circuit in one embodiment of the invention. As a result, BER performance is not impaired across different PVT corners and gain peaking is more consistent across different PVT corners. (RCOMP codes, discussed further below, are used to compensate for impedance mismatches at I/O pads of I/O drivers.)

Figure 2:
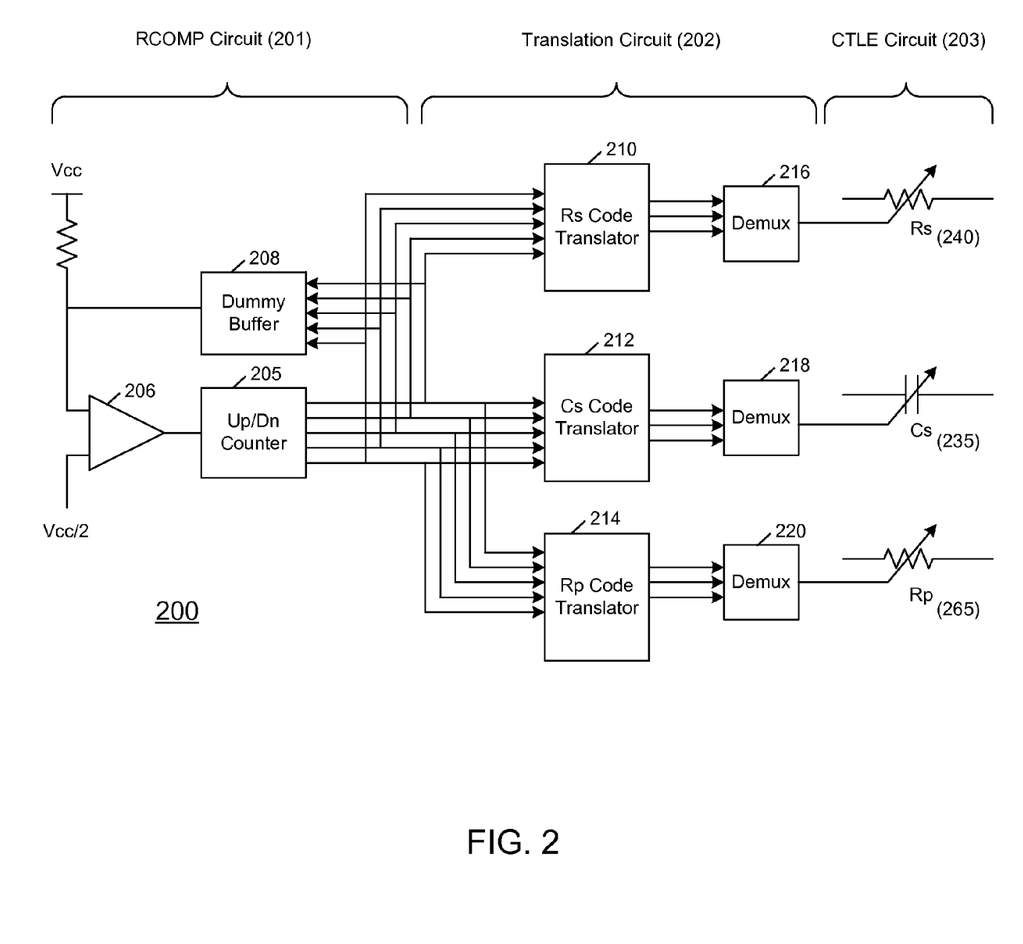
FIG. 2 includes a block diagram of a control circuit in an embodiment of the invention.

In general FIG. 2 includes a block diagram for an embodiment of the invention, which includes an adaptive receiver equalizer in a high speed data link. FIG. 2 includes a resistance compensation circuit 201, such as but not limited to an RCOMP circuit. The RCOMP circuit drives translation circuit 202. Translation circuit 202 then produces programming logic (e.g., codes) to set or control various settings of equalization circuit 203 such as, but not limited to, adaptive receiver equalizer logic found in a CTLE circuit.

More specifically, in order to compensate for gain variations across PVT skews or corners an embodiment uses programming, such as but not limited to RCOMP codes, that changes based on changes in PVT conditions. For example, in one embodiment RCOMP circuit 201 generates 5 bit binary codes (see 5 lines output by counter 205 and input into translators 210, 212, 214) ranging from 00000 to 11111 (0 to 31 in decimal count) across a range of PVT skews. These codes, once translated by translation circuit 202, individually adjust one or all of Rs 240, Cs 235, and/or Rp 265 of CTLE circuit 203. Thus, there may be 32 binary codes in RCOMP circuit 201 to accommodate 32 PVT corners or other conditions. Other embodiments are not limited to 5 bits.

FIG. 2 concerns an embodiment where there are 8 sets of values for each of Rs 240, Cs 235, and Rp 265 (although other embodiments may provide such values for fewer than all of Rs, Cs, and Rp). Values of Rs 240, Cs 235, and Rp 265 are individually chosen such that across different PVT corners appropriate Rs, Cs, and Rp values will provide adequate gain peaking that is consistent across the corners, leading to acceptable BERs across varying PVT corners. Each of these 8 different values will be individually selected by a 3 digit binary code (notice 3 lines output by each of translators 210, 212, 214 respectively to Demuxes 216, 218, 220) but other embodiments are not limited to 3 bit codes). The 3 bit code is selected according to the 5 bit RCOMP code discussed above.

Simulations of a proposed circuit will show the optimum values of Rs 240, Cs 235, and Rp 265 of circuit 203 required to maintain constant gain peaking across various PVT combinations. Thus, for each of Rs 240, Cs 235, and Rp 265 a mapping table may be populated with values that show specific PVT corners and binary codes for those corners. In some embodiments, the table is a look-up table accessed by software (e.g., BIOS) but in other embodiments the decision making regarding the table may be accomplished in hardware using logic circuits.

Figure 4:
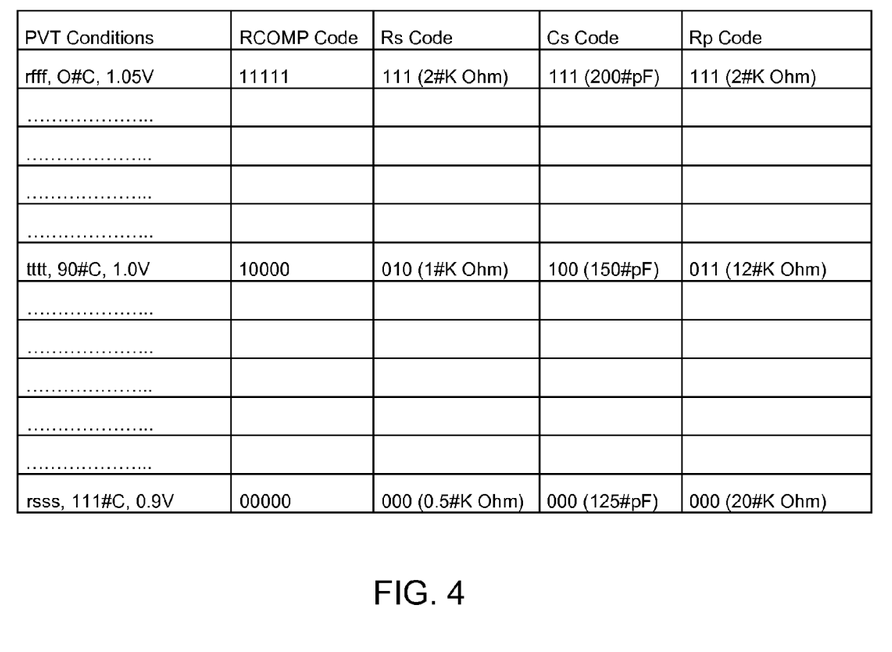
FIG. 4 includes a table with impedance or resistance control codes in an embodiment of the invention.

FIG. 4 includes an example mapping table whereby, for example, the rfff corner (0 degrees Celsius) requires a 1.05 Vcc setting in logic 201 and corresponds to a 5 bit code (11111) output by Up/Down Counter 205. (For corner nomenclature, "t" denotes a "typical" setting, "f" denotes a "fast" setting, "s" denotes a slow setting, and "r" denotes a "realistic" setting for various components of a circuit.) The output code is communicated to Rs code translator 219, which works with demultiplexor (Demux) 216 to determine a 3 bit code (111) for Rs (resistance element 240) that corresponds to a resistance of 2 KOhm. The output code is also communicated to Cs code translator 212, which works with Demux 218 to determine a 3 bit code (111) for Cs (capacitive element 235) that corresponds to a capacitance of 200 pF. The output code is also communicated to Rp code translator 219, which works with Demux 220 to determine a 3 bit code (111) for Rp (resistance elements 265 and/or 275) that corresponds to a resistance of 2 KOhm.

The tttt corner (90 degrees Celsius) requires a 1.00 V setting and corresponds to a 5 bit code (10000) output by Up/Down Counter 205. The output code is communicated to Rs code translator 219 to determine a 3 bit code (010) for Rs (resistance element 240) that corresponds to a resistance of 1 KOhm. The output code is also communicated to Cs code translator 212 to determine a 3 bit code (100) for Cs (capacitive element 235) that corresponds to a capacitance of 150 pF. The output code is also communicated to Rp code translator 219 to determine a 3 bit code (011) for Rp (resistance elements 265 and/or 275) that corresponds to a resistance of 12 KOhm Other examples are provided in FIG. 4 (see, e.g., entry for rsss corner).

A table or memory unit such as FIG. 4 is populated with values based on, for example, circuit simulation to determine ideal Rs, Cs, and/or Rp values for various PVT settings and corners. The complete mapping table may then be used to maintain a nearly constant gain peaking across different PVT corners.

Returning to FIG. 2 and RCOMP circuit 201, in an embodiment differential amplifier 206 receives an input from Vcc/2 and another input from Vcc and dummy buffer 208. For the rsss corner of FIG. 4, Vcc may be 0.9 V with a Vcc/2 of 0.45 V. This may be a setting that generates an impedance for the PVT conditions of the rsss corner. In operation, should the inputs to amplifier 206 not be equal the differential amplifier amplifies the differential and feeds that value (e.g., an analog voltage signal) to counter 205, which then counts up or down depending on the output from amplifier 206 and then outputs a 5 bit RCOMP code to translators 210, 212, 214. The code also drives a transistor bank included in buffer 208 that adjusts resistance in the feedback look that drives one input of amplifier 206. The closed feedback loop operates until stability is reached with differential amplifier 206 (and there is no differential value to amplify and feed to counter 205) and the resulting RCOMP codes from counter 205.

A more detailed discussion of various resistance compensations circuits, such as RCOMP circuits, is available in, for example, U.S. Pat. No. 7,161,851. There, for example, a series of transistors (analogous to block 208 of the present application) are discussed for FIG. 1 for varying impedance of the circuit. U.S. Pat. No. 6,380,758 also discusses RCOMP circuits that are included in various embodiments of the invention. For example, in FIG. 3 of U.S. Pat. No. 6,380,758 a compensation controller including a state machine, two up/down counters (analogous to block 205 of the present application), an up comparator (UPCOMP), a down comparator (DNCOMP), and two registers. The state machine operates with a CLK signal to generate control signals to the up/down counters and to a compensation driving circuit. The up/down counters count up or down to generate corresponding compensation codes to the compensation driving circuit. A typical driving circuit includes a number of pull-up and pull-down devices, as shown in FIG. 4A of U.S. Pat. No. 6,380,758 (and analogous to block 208 of the present application). In one embodiment, the pull-up device is a p-channel metal oxide semiconductor (PMOS), referred to as a p-device, and the pull-down device is an n-channel metal oxide semiconductor (NMOS), referred to as an n-device. A typical driver has a number of pull-up legs and pull-down legs. The RCOMP codes are for p- and n-devices at the driving circuit that drives a bus, interconnect, or link. Comparators compare the voltage level at a pad of the bus with the reference voltages VUP and VDN, respectively. The VUP and VDN reference voltages are the desired upper and lower buffer output swing levels, respectively. The registers latch or clock the result of the comparisons to provide feedback information for the state machine in the form of the LUP and LDN signals. The p- and n-devices are enabled in turn. The RCOMP codes are thus generated to control the adjustment of p- and n-devices at the driving circuit. For example, as more legs of the p-devices are enabled, current can be conducted more strongly and the resistance is reduced.

Figure 3:
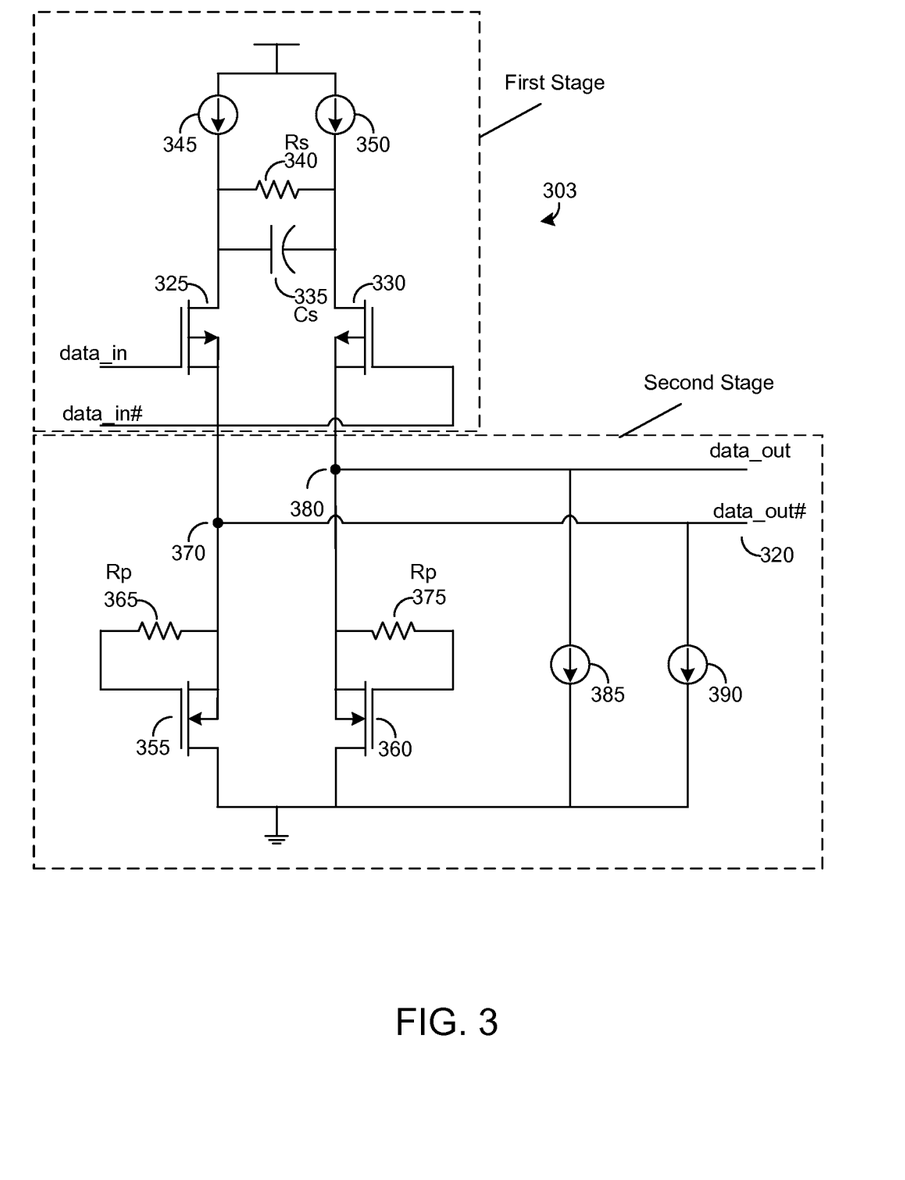
FIG. 3 includes equalization logic/circuitry in an embodiment of the invention.

With the general discussion of FIG. 2 and RCOMP circuits discussed above, attention now turns to CTLE circuit 203. FIG. 3 includes an example of equalization logic 203. Other embodiments use different equalization circuits. Logic 303 of FIG. 3 includes a second order CTLE circuit. Parallel resistor 340 (sometimes referred herein as "Rs") and capacitor 335 (sometimes referred herein as "Cs") create a first zero/pole pair in the frequency response. In the second stage of CTLE circuit 303, resistors 365, 375 (sometimes referred herein as "Rp" based on 365 and/or 375) in the PMOS load (connected to the amplifier output) create a second zero/pole pair. Equalization is provided by selecting the value of components Rs, Cs, and/or Rp appropriately (e.g., by using RCOMP codes to select the values). The circuit reduces low frequency gain and increases high frequency gain.

A more detailed discussion of CTLE circuit 303 is now provided. Circuit 303 includes the first stage receiving a differential input signal (data_in, data_in#), and outputting a differential output signal (data_out, data_out#). Circuit 303 may be included in, for example, processor 680 (FIG. 6) and receive input signals from, for example, memory 634 (and be controlled via the demux 216, 218, 220 signals from FIG. 2). As will be illustrated below, the transfer function of circuit 303 exhibits two zeros and three poles in the frequency domain (but other scenarios are possible). Portion data_in of the differential input signal is received at a gate of PMOS transistor 325. Portion data_in# of the differential input signal is received by a gate of PMOS transistor 330. A first node of capacitive element 335 is coupled to a drain of transistor 325 and a second node of capacitive element 335 is coupled to a drain of transistor 330. Capacitive element 335 may comprise any capacitive element or elements that are or become known.

A first node of resistive element 340 is coupled to the drain of transistor 325 and a second node of resistive element 340 is coupled to the drain of transistor 330. A first node of current source 345 is coupled to a supply voltage and a second node of current source 345 is coupled to the first node of resistive element 340. Similarly, a first node of current source 350 is coupled to the supply voltage and a second node of current source 350 is coupled to the second node of resistive element 340.

Circuit 303 also includes n-type metal-oxide semiconductor (NMOS) transistor 355 and NMOS transistor 360, drains of which are coupled to ground. Resistive element 365 includes a first node and a second node, with the first node of resistive element 365 being coupled to a gate of transistor 355 and the second node of resistive element 365 being coupled to a source of transistor 355. The second node is also coupled to output node 370 of the first stage, which outputs portion data_out# of the output differential signal.

Resistive element 375 also includes a first node and a second node. The first node of resistive element 375 is coupled to a gate of transistor 360 and the second node of resistive element 375 is coupled to a source of transistor 360 and to output node 380 of the first stage. Output node 380 is to output portion data_out of the output differential signal.

Circuit 303 also includes current source 385 and current source 390. A first node of current source 385 is coupled to output node 380 and a second node of current source 385 is coupled to ground. A first node of current source 390 is coupled to output node 370 and a second node of current source 390 is coupled to ground. Current sources 385 and 390 may be controlled to control an operating point of circuit 303 and/or to provide offset correction. Some embodiments of circuit 303 do not include current sources 385 and 390.

The transfer function of circuit 303 may be equal to:

$$\frac{g_{m1}}{g_{m2}\left(1+g_{m1}\frac{R_s}{2}\right)}\frac{(1+sR_sC_s)(1+sR_pC_g)}{\left(1+s\frac{R_sC_s}{\left(1+g_{m1}\frac{R_s}{2}\right)}\right)\left(1+s\frac{C_g+C_L}{g_{m2}}+s^2\frac{R_pC_gC_L}{g_{m2}}\right)},$$

where Rs is a resistance of resistive element 340, Rp is a resistance of resistive elements 365 and 375, $g_{m1}$ is a transconductance of the differential transistor pair 325/330, $g_{m2}$ is a transconductance of transistors 355 and 360, Cg is a total capacitance at the gate of transistors 355 and 360, and CL is a total capacitance at output nodes 370 and 380. CL may take into account loads of any circuits attached thereto.

At least one of resistive elements 340, 365 and 375 may comprise a variable resistive element including but not limited to an active transistor circuit. The poles and zeroes of the above transfer function may be controlled by appropriate selection of the various components of circuit 303, and may also be controlled during operation by varying resistances of the resistive elements. Furthermore, capacitive element 335 may comprise a variable capacitive element.

FIG. 5 includes a process in an embodiment of the invention. In block 505 the PVT conditions are determined. This determination may be direct or indirect. For example, these values may be directly sensed (e.g., sensing temperature of a component or environment) or indirectly monitored (e.g., a voltage level fed back to amplifier 206 of FIG. 2). In block 510 resistance compensation is determined based on the previously determined PVT conditions and in block 515 circuit component settings (e.g., settings for components 240, 235, 265) are selected from a predetermined plurality of settings. For example, counter 205 may determine a voltage level output from amplifier 206 and then determine values, directly or indirectly, for Rs 240, Cs 235, and Rp 265. These values may be determine via a look-up table populated with values (see, e.g., FIG. 4), via a hardware logic circuit, and the like. In block 520 instructions are communicated to an equalization circuit (e.g., a CTLE circuit), based on values determined earlier in the process, to adjust circuit components of the equalization circuit. For example, the instructions may include programming (e.g., a RCOMP code) that controls, directly or indirectly (e.g., via translation in translators 210, 212, 214 and Demuxes 216, 218, 220), components such as Rs 240, Cs 235, and/or Rp 265. Block 525 includes adjusting the circuit components based on the above process. For example, Rs 240, Cs 235, and/or Rp 265 of CTLE circuit 203 may be adjusted.

An embodiment is appropriate for receiver equalizer adaptation in high speed I/O links (e.g., PCIe generation 3). Such receiver equalization may require close loop circuits and a separate Finite State Machine (FSM) in some embodiments but other embodiments avoid the need for another complex closed loop circuit by making use of an RCOMP circuit.

Embodiments are not limited to that of FIG. 2. For example, embodiments may include just a portion of FIG. 2 (e.g., RCOMP circuit 201 and translation circuit 202 but not CTLE circuit 203), may concern FIG. 4 but not necessarily use RCOMP circuit 201, and the like. In an embodiment, translators 210, 212, and 214 may be omitted and a code from counter 205 may directly interface a Demux or Demuxes 216, 218, 220 and more directly program Rs 240, Cs 235, and/or Rp 265. In other words, a 5 bit code may suffice to individually program Rs 240, Cs 235, and/or Rp 265 without need for translation from the 5 bit code to 3 bits codes.

Figure 6:
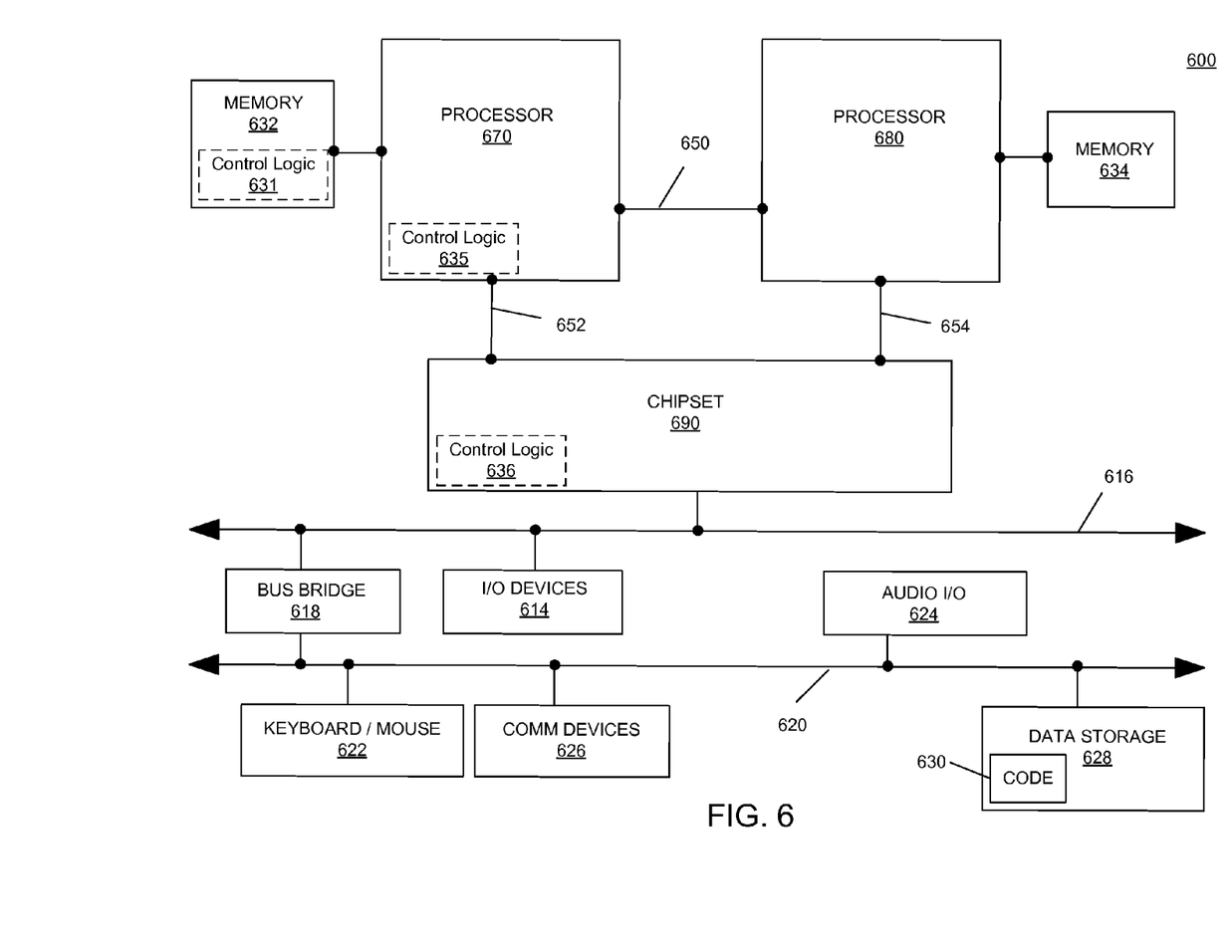
FIG. 6 includes a system that may be used with an embodiment of the invention.

Embodiments may be implemented in many different system types. Referring now to FIG. 6, shown is a block diagram of a system (e.g., cell phone, Ultrabook, notebook, laptop, desktop, mobile computing device, tablet, person digital assistant, and the like) in accordance with an embodiment of the present invention. Embodiments, such as the embodiment of FIG. 2, may be used to equalize performance of system 600 across PVT corners and conditions. Multiprocessor system 600 is a point-to-point interconnect system, and includes a first processor 670 and a second processor 680 coupled via a point-to-point interconnect 650. Each of processors 670 and 680 may be multicore processors. The term "processor" may refer to any device or portion of a device that processes electronic data from registers and/or memory to transform that electronic data into other electronic data that may be stored in registers and/or memory. First processor 670 may include a memory controller hub (MCH) and point-to-point (P-P) interfaces. Similarly, second processor 680 may include a MCH and P-P interfaces. The MCHs may couple the processors to respective memories, namely memory 632 and memory 634, which may be portions of main memory (e.g., a dynamic random access memory (DRAM)) locally attached to the respective processors. First processor 670 and second processor 680 may be coupled to a chipset 690 via P-P interconnects, respectively. Chipset 690 may include P-P interfaces. Furthermore, chipset 690 may be coupled to a first bus 616 via an interface. Various input/output (I/O) devices 614 may be coupled to first bus 616, along with a bus bridge 618, which couples first bus 616 to a second bus 620. Various devices may be coupled to second bus 620 including, for example, a keyboard/mouse 622, communication devices 626, and data storage unit 628 such as a disk drive or other mass storage device, which may include code 630, in one embodiment. Code may be included in one or more memories including memory 628, 632, 634, memory coupled to system 600 via a network, and the like. Further, an audio I/O 624 may be coupled to second bus 620.

Embodiments may be implemented in code and may be stored on storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (635). However, in another embodiment, logic also includes software or code (631). Such logic may be integrated with hardware, such as firmware or micro-code (636). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

In an embodiment a system comprises: a processor; and an input/output (I/O) link, coupled to the processor, to compensate for process, voltage, and temperature (PVT) effects, the link including: execution logic to determine first and second compensation codes; and a driving circuit, coupled to the execution logic, to control impedance based on the first and second compensation codes; wherein (a) the first code corresponds to a first variable resistance code for a variable resistive element, a first variable capacitance code for a variable capacitive element, and a first PVT condition; and (b) the second code corresponds to a second variable resistance code for the variable resistive element, a second variable capacitance code for the variable capacitive element, and a second PVT condition unequal to the first PVT condition. In an embodiment the first and second codes are to generate generally consistent gain peaking for both of the first and second PVT conditions. In an embodiment the first code corresponds to a first PVT corner and the second code corresponds to a second PVT corner. In an embodiment the driving circuit comprises a CTLE circuit including the variable resistive element and the variable capacitive element. In an embodiment the link includes a differential amplifier to receive impedance feedback based on the first and second PVT conditions and generate an output signal. In an embodiment the execution logic includes a counter coupled to the amplifier and is to select one of the first and second codes based on the output signal. In an embodiment the variable resistive element and the variable capacitive element are included in different stages of the CTLE circuit. In an embodiment the variable resistive element includes a variable resistor and the variable capacitive element includes a variable capacitor. In an embodiment the first and second variable resistance codes and the first and second variable capacitance codes are included in non-volatile memory coupled to the link. In an embodiment the link includes a PCIe based link. In an embodiment the first and second codes are to generate generally consistent gain peaking at data rates of at least 8 gigabytes per second for both of the first and second PVT conditions.

An embodiment includes an apparatus comprising: control logic to determine first and second process, voltage, and temperature (PVT) conditions for an input/out (I/O) link and generate first and second impedance configurations based on the determined first and second PVT conditions; and driving logic, coupled to the control logic, to control impedance based on the first and second impedance configurations; wherein (a) the first impedance configuration corresponds to a first variable resistance setting for a variable resistive element, a first variable capacitance setting for a variable capacitive element, and the first PVT condition; and (b) the second impedance configuration corresponds to a second variable resistance setting for the variable resistive element, a second variable capacitance setting for the variable capacitive element, and the second PVT condition that is unequal to the first PVT condition. In an embodiment the first and second impedance configurations are to generate generally consistent gain peaking for both of the first and second PVT conditions. In an embodiment the first impedance configuration corresponds to a first PVT corner and the second impedance configuration corresponds to a second PVT corner. In an embodiment the driving logic comprises a Continuous Time Linear Equalization (CTLE) circuit including the variable resistive element and the variable capacitive element. An embodiment includes a differential amplifier to receive impedance feedback based on the first and second PVT conditions and generate an output signal. In an embodiment the control logic comprises a counter, coupled to the amplifier, to select one of the first and second impedance configurations based on the output signal. In an embodiment the variable resistive element and the variable capacitive element are included in different stages of the CTLE circuit. In an embodiment the variable resistive element includes a variable resistor and the variable capacitive element includes a variable capacitor. In an embodiment the first impedance configuration is one of a setting included in a lookup table and a logic circuit configuration.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a processor; and
   an input/output (I/O) link, coupled to the processor, to compensate for process, voltage, and temperature (PVT) effects, the link including:
   execution logic to determine first and second compensation codes; and
   a driving circuit, coupled to the execution logic, to control impedance based on the first and second compensation codes;
   wherein (a) the first code corresponds to a first variable resistance code for a variable resistive element, a first variable capacitance code for a variable capacitive element, and a first PVT condition; and (b) the second code corresponds to a second variable resistance code for the variable resistive element, a second variable capacitance code for the variable capacitive element, and a second PVT condition unequal to the first PVT condition.

2. The system of claim 1, wherein the first and second codes are to generate generally consistent gain peaking for both of the first and second PVT conditions.

3. The system of claim 2, wherein the first code corresponds to a first PVT corner and the second code corresponds to a second PVT corner.

4. The system of claim 1, the driving circuit comprising a Continuous Time Linear Equalization (CTLE) circuit including the variable resistive element and the variable capacitive element.

5. The system of claim 4, wherein the link includes a differential amplifier to receive impedance feedback based on the first and second PVT conditions and generate an output signal.

6. The system of claim 5, wherein the execution logic includes a counter coupled to the amplifier and is to select one of the first and second codes based on the output signal.

7. The system of claim 4, wherein the variable resistive element and the variable capacitive element are included in different stages of the CTLE circuit.

8. The system of claim 7, wherein the variable resistive element includes a variable resistor and the variable capacitive element includes a variable capacitor.

9. The system of claim 1, wherein the first and second variable resistance codes and the first and second variable capacitance codes are included in non-volatile memory coupled to the link.

10. The system of claim 1 wherein the link includes a Peripheral Component Interconnect Express (PCIe) based link.

11. The system of claim 1, wherein the first and second codes are to generate generally consistent gain peaking at data rates of at least 8 gigabytes per second for both of the first and second PVT conditions.

12. An apparatus comprising:
    control logic to determine first and second process, voltage, and temperature (PVT) conditions for an input/out (I/O) link and generate first and second impedance configurations based on the determined first and second PVT conditions; and
    driving logic, coupled to the control logic, to control impedance based on the first and second impedance configurations;
    wherein (a) the first impedance configuration corresponds to a first variable resistance setting for a variable resistive element, a first variable capacitance setting for a variable capacitive element, and the first PVT condition; and (b) the second impedance configuration corresponds to a second variable resistance setting for the variable resistive element, a second variable capacitance setting for the variable capacitive element, and the second PVT condition that is unequal to the first PVT condition.

13. The apparatus of claim 12, wherein the first and second impedance configurations are to generate generally consistent gain peaking for both of the first and second PVT conditions.

14. The apparatus of claim 13, wherein the first impedance configuration corresponds to a first PVT corner and the second impedance configuration corresponds to a second PVT corner.

15. The apparatus of claim 12, the driving logic comprising a Continuous Time Linear Equalization (CTLE) circuit including the variable resistive element and the variable capacitive element.

16. The apparatus of claim 15 comprising a differential amplifier to receive impedance feedback based on the first and second PVT conditions and generate an output signal.

17. The apparatus of claim 16, the control logic comprising a counter, coupled to the amplifier, to select one of the first and second impedance configurations based on the output signal.

18. The apparatus of claim 15, wherein the variable resistive element and the variable capacitive element are included in different stages of the CTLE circuit.

19. The apparatus of claim 18, wherein the variable resistive element includes a variable resistor and the variable capacitive element includes a variable capacitor.

20. The apparatus of claim 12, wherein the first impedance configuration is one of a setting included in a lookup table and a logic circuit configuration.

21. An apparatus comprising:
    an input/output (I/O) module including a continuous time linear equalization (CTLE) circuit, wherein the I/O module is to:
    determine a first process, voltage, temperature (PVT) condition; and
    dynamically adjust a gain peaking frequency and a gain peaking amplitude for the CTLE circuit based on the first PVT condition.

22. The apparatus of claim 21, wherein the I/O module is to:
    to determine first and second compensation codes; and
    control impedance based on the first and second compensation codes;
    wherein (a) the first code corresponds to a first variable resistance code for a variable resistive element included in the CTLE circuit, a first variable capacitance code for a variable capacitive element included in the CTLE circuit, and the first PVT condition; and (b) the second code corresponds to a second variable resistance code for the variable resistive element, a second variable capacitance code for the variable capacitive element, and a second PVT condition unequal to the first PVT condition.

23. The apparatus of claim 22, wherein the first and second codes are to generate generally consistent gain peaking for both of the first and second PVT conditions.

24. The apparatus of claim 22, wherein the first code corresponds to a first PVT corner and the second code corresponds to a second PVT corner.

25. The apparatus of claim 22, wherein the first and second codes are to generate generally consistent gain peaking at data rates of at least 8 gigabytes per second for both of the first and second PVT conditions.

* * * * *